United States Patent
Kobayashi et al.

(10) Patent No.: US 8,247,475 B2
(45) Date of Patent: Aug. 21, 2012

(54) HYDROTALCITE-BASED COMPOUND PARTICLES, RESIN STABILIZER USING THE SAME, HALOGEN-CONTAINING RESIN COMPOSITION AND ANION SCAVENGER USING THE SAME

(75) Inventors: Naoya Kobayashi, Ohtake (JP); Torayuki Honmyo, Ohtake (JP)

(73) Assignee: Toda Kogyo Corporation, Hiroshima-shi, Hiroshima-ken (JP)

( * ) Notice: Subject to any disclaimer, the term of this patent is extended or adjusted under 35 U.S.C. 154(b) by 593 days.

(21) Appl. No.: 11/639,434

(22) Filed: Dec. 15, 2006

(65) Prior Publication Data

US 2007/0161727 A1    Jul. 12, 2007

(30) Foreign Application Priority Data

Dec. 29, 2005   (JP) ................. 2005-380579

(51) Int. Cl.
    *C08K 9/04*    (2006.01)
    *C08K 3/10*    (2006.01)
(52) U.S. Cl. ........ 523/200; 428/403; 524/436; 524/567; 524/568
(58) Field of Classification Search ................. 428/403; 523/200; 524/436, 567, 568
    See application file for complete search history.

(56) References Cited

U.S. PATENT DOCUMENTS

| 6,287,532 B1 | 9/2001 | Okada et al. |
| 6,413,639 B1 | 7/2002 | Kobayashi et al. |
| 6,418,661 B1 | 7/2002 | Takahashi et al. |

FOREIGN PATENT DOCUMENTS

| EP | 0 989 095 A | 3/2000 |
| EP | 1 052 223 A | 11/2000 |
| EP | 1 088 853 A | 4/2001 |

*Primary Examiner* — Vickey Nerangis
(74) *Attorney, Agent, or Firm* — Nixon & Vanderhye P.C.

(57) ABSTRACT

According to the present invention, there are provided hydrotalcite-based compound particles surface-treated with an organic compound having not less than 3 carbon atoms, have a specific surface area of 5 to 150 m²/g, wherein a conceptual value x corresponding to micropores and ultramicropores, and a conceptual value y corresponding to volumes of macropores and micropores, both calculated from a water vapor adsorption curve thereof when exposed to a temperature of 25° C. and a humidity of 50% for 250 hours, are respectively within specific ranges. The hydrotalcite-based compound particles of the present invention are capable of capturing even a very small amount of halogens contained in various resins, and exhibiting an excellent effect of preventing deterioration of the resins. Further, the hydrotalcite-based compound particles of the present invention are used in the form of particles or a molded product and are capable of exhibiting a function for capturing an anionic organic or inorganic compound from a solution to a maximum extent without being dissolved, by themselves, in the solution.

14 Claims, No Drawings

HYDROTALCITE-BASED COMPOUND PARTICLES, RESIN STABILIZER USING THE SAME, HALOGEN-CONTAINING RESIN COMPOSITION AND ANION SCAVENGER USING THE SAME

BACKGROUND OF THE INVENTION

The present invention relates to hydrotalcite-based compound particles, a resin stabilizer using the particles, a halogen-containing resin composition and an anion scavenger using the particles. More particularly, the present invention relates to hydrotalcite-based compound particles having excellent effects of imparting a good thermal stability to resins and preventing initial coloration of the resins when added thereto, a resin stabilizer using the hydrotalcite-based compound particles, a halogen-containing resin composition containing hydrotalcite-based compound particles, and an anion scavenger using the hydrotalcite-based compound particles.

The hydrotalcite-based compound particles of the present invention are capable of capturing even a very small amount of halogens contained in various resins, and can exhibit an excellent effect of preventing deterioration of the resins. In addition, the hydrotalcite-based compound particles of the present invention can be used in the form of particles or a molded product to exhibit a function of capturing anionic organic or inorganic compounds from a solution to a maximum extent without being dissolved, by themselves, in the solution.

Conventionally, in order to attain a good thermal stability of halogen-containing resins, in particular, when processed under heating, lead compounds have been frequently added thereto. However, in recent years, adverse influence of the lead compounds on environments and human bodies has been noticed, so that tin compounds, clay minerals such as hydrotalcite-based compounds, etc., which have a less burden on environments and human bodies, have been used in place of the lead compounds.

In general, the hydrotalcite-based compounds have a structure represented by the following chemical formula:

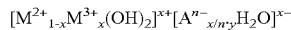

$$[M^{2+}_{1-x}M^{3+}_x(OH)_2]^{x+}[A^{n-}_{x/n} \cdot yH_2O]^{x-}$$

wherein $M^{2+}$ represents at least one divalent metal ion selected from the group consisting of $Mg^{2+}$, $Zn^{2+}$, $Ca^{2+}$, $Fe^{2+}$, $Co^{2+}$, $Ni^{2+}$ and $Cu^{2+}$, or $Li^+$; $M^{3+}$ represents at least one trivalent metal ion selected from the group consisting of $Al^{3+}$, $Fe^{3+}$, $Mn^{3+}$ and $Cr^{3+}$; $A^{n-}$ represents a n-valent anion such as $OH^-$, $Cl^-$, $CO_3^{2-}$, $SO_4^{2-}$ and inorganic and/or organic anions; x is a number of 0.2 to 0.56; and y is a number of usually 0.5, and may be a number of more than 0.5 when absorbing water therein, or 0.4 or 0.2 when subjected to dehydration treatment. When the hydrotalcite-based compounds are treated such that x is as close to 0 as possible, the structure of the hydrotalcite-based compounds is broken, so that the compounds are transformed into oxides or composite oxides. Therefore, the amount of crystal water contained in the hydrotalcite-based compounds is generally controlled to a level according to applications thereof.

The hydrotalcite-based compounds have a laminated crystal structure including a two-dimensional basic layer in which positively-charged octahedral brucite units are arranged in rows, and a negatively-charged intermediate layer. The hydrotalcite-based compounds used in the present invention preferably have such a structure represented by the above chemical formula in which $M^{2+}$ is $Ni^{2+}$, $Cu^{2+}$, $Fe^{2+}$, $Mg^{2+}$, $Ca^{2+}$, $Zn^{2+}$ or $Li^+$; $M^{3+}$ is $Al^{3+}$ or $Fe^{3+}$; x is a number of 0.2 to 0.56; and $A^{n-}$ is not particularly limited.

In the case where the hydrotalcite-based compound particles are used as a stabilizer for resins, in order to enhance a dispersibility of the particles in the resins, or prevent the hydrotalcite-based compounds themselves from being deteriorated due to halogens generated upon processing halogen-containing resins under heating, the surface of the respective hydrotalcite-based compound particles is usually coated with an organic compound.

For the purpose of protecting the hydrotalcite-based compound particles themselves, in particular, against halogens, the surface treatment is designed such that a whole surface of the respective particles is coated thick with the organic compound. However, the hydrotalcite-based compound particles whose surface is coated thick with the organic compound tend to be deteriorated in functions thereof, thereby failing to fully exhibit excellent effects on a thermal stability of stabilizers or resin compositions.

Also, the hydrotalcite-based compound particles have been used for removing halogen compounds, halogen ions or molecules and anionic organic or inorganic compounds from waste water.

As the method for removing a very small amount of iodine or anionic organic compounds contained in waste water, there may be exemplified a method of contacting the hydrotalcite-based compound in the form of particles or a molded product with waste water to remove substantially a whole amount of iodine or anionic organic compounds from the waste water by controlling contact area as well as treating temperature and time as well as amount of waste water passed therethrough. Further, there may also be exemplified a method in which the hydrotalcite-based compound is used in combination with activated carbon such that the adsorption in a region where a larger amount of iodine or anionic organic compounds are present in the waste water, is first conducted using the activated carbon, and then the adsorption in a region where only a very small amount of iodine or anionic organic compounds are present in the waste water, is conducted using the hydrotalcite-based compound.

However, the hydrotalcite-based compounds used for capturing or adsorbing halogens tend to be basically made of a Mg—Al-based material, a Ca—Al-based material or a mixed phase thereof. Therefore, when contacted with the waste water, the hydrotalcite-based compounds tend to suffer from not only elution of Mg or Ca as an alkali earth metal element, but also severe elution of Al when the waste water is highly alkaline or strongly acidic. For this reason, it is required to protect the surface of the respective hydrotalcite-based compound particles by coating the surface with an organic compound. However, in the conventional surface treatments, organic compounds used therein tend to be insufficient in kinds and treating amount to protect the surface thereof. As a result, when the surface-treated hydrotalcite-based compound particles are used for capturing or adsorbing halogens, the waste water after being subjected to capturing or adsorption of halogens using the surface-treated hydrotalcite-based compound particles, must be controlled in pH value thereof and then subjected to precipitation and filtration treatments to remove eluted elements such as Mg, Ca and Al from the waste water. This inevitably leads to necessity of additional equipments.

On the other hand, upon production of polyolefin resins or upon impart of a good flame retardancy to polyolefin resins or polyamide resins by adding a halogen-containing flame retardant or a halogen-containing flame retarding assistant thereto, these resins contain a very small amount of halogens, so that there tend to arise various problems such as deterioration of the resins when processed under heating. In order to prevent the deterioration of resins, as a halogen scavenger, there may be usually used the hydrotalcite-based compound particles.

In this case, in order to enhance a dispersibility of the hydrotalcite-based compound particles in the resins, or prevent the hydrotalcite-based compound particles themselves from being deteriorated upon processing the halogen-containing resins under heating, it has been required to treat the surface of the respective hydrotalcite-based compound particles with an organic compound.

In the surface treatment, in particular, in order to prevent deterioration of the hydrotalcite-based compound particles due to halogens generated, it has been strongly demanded that a whole surface of the respective hydrotalcite-based compound particles is coated thick with the organic compound. However, the hydrotalcite-based compound particles whose surface is wholly coated thick with the organic compound tend to come into a poor contact with the halogens and, therefore, tend to be deteriorated in function as a halogen catcher (scavenger).

To solve the above conventional problems, various surface-treating agents have been proposed in Japanese Patent Application Laid-open (KOKAI) Nos. 2002-212355, 2003-147227, 2002-293535, 2003-040614, 06-345963(1994), 07-062162(1995), 05-214177(1993), 2001-019428, 2000-024658, 2002-121461 and 11-349850 (1999), and Japanese Patent Application Publication (TOKUHYO) 2002-506910.

However, in the above-described documents, there are not described optimum combination of kinds and treating amounts of these surface-treating agents in view of attaining a good thermal stability of the halogen-containing resins or preventing initial coloration thereof.

Also, in the above-described documents, there are not described such hydrotalcite-based compound particles used as surface-treating agents which are optimized in the combination of kinds and treating amounts in order to capture a very small amount of halogens contained in polyolefin resins upon production thereof, or to prevent deterioration of polyolefin resins or polyamide resins due to a halogen-based flame retardant added thereto upon processing these resins.

Further, in the above-described documents, there are not described optimum combination of kinds and treating amounts of surface-treating agents composed of the hydrotalcite-based compound particles for the purposes of adsorbing anions contained in a solution such as waste water or minimizing dissolution of the hydrotalcite-based compound particles therein.

As a result of the present inventors' earnest study for solving the above conventional problems, it has been found that hydrotalcite-based compound particles which are surface-treated with an organic compound, and have a limited specific surface area as well as a specific conceptual value x corresponding to volumes of micropores and ultramicropores thereof and a specific conceptual value y corresponding to volumes of macropores and micropores thereof, can exhibit excellent effects on a thermal stability of resins and prevention of initial coloration thereof when added to the resins. The present invention has been attained on the basis of the above finding.

SUMMARY OF THE INVENTION

An object of the present invention is to provide hydrotalcite-based compound particles capable of exhibiting excellent effects on a thermal stability of resins and prevention of initial coloration thereof when added to the resins, and further an excellent effect of capturing a very small amount of halogens contained in various resins such as polyolefins and polyamides.

Another object of the present invention is to provide a resin stabilizer using the hydrotalcite-based compound particles, which is capable of exhibiting excellent effects on a thermal stability of resins and prevention of initial coloration thereof.

A further object of the present invention is to provide a halogen-containing resin composition which is excellent in thermal stability and is prevented from suffering from initial coloration.

A still further object of the present invention is to provide an anion scavenger using the hydrotalcite-based compound particles, which has a function for capturing anionic organic or inorganic compounds from a solution.

To accomplish the aims, in a first aspect of the present invention, there are provided hydrotalcite-based compound particles which are surface-treated with an organic compound having not less than 3 carbon atoms, and have a specific surface area of 5 to 150 m$^2$/g, a conceptual value x of 0.035 to 0.60 and a conceptual value y of 0.22 to 0.30, wherein the conceptual value x corresponds to x represented by the following formula:

$$x=(P/(V\times(P_0-P)))/(P/P_0)$$

(wherein V is a water vapor adsorption; P is a pressure at a measuring position; and $P_0$ is an atmospheric pressure), and
the conceptual value y corresponds to y represented by the following formula:

$$y=V_m/S_{SET}$$

(wherein $V_m$ is a water vapor adsorption at $P/P_0$=0.2; and $S_{SET}$ is a specific surface area of the sample), in which the values x and y are determined from a water vapor adsorption curve thereof in a range where $P/P_0$ is 0.045 to 0.355 when exposed to a temperature of 25° C. and a humidity of 50% for 250 hours.

In a second aspect of the present invention, there is provided a resin stabilizer comprising the hydrotalcite-based compound particles as defined in the above first aspect and a metal soap compound.

In a third aspect of the present invention, there is provided a halogen-containing resin composition containing 0.01 to 30 parts by weight of the hydrotalcite-based compound particles as defined in the above first aspect based on 100 parts by weight of a halogen-containing resin.

In a fourth aspect of the present invention, there is provided a halogen scavenger for capturing a very small amount of halogens contained in polyolefin resins and/or halogens generated from halogen-based additives contained in resins, comprising the hydrotalcite-based compound particles as defined in the above first aspect.

In a fifth aspect of the present invention, there is provided an anion scavenger for capturing anions from a solution, comprising particles or a molded product of the hydrotalcite-based compound particles as defined in the above first aspect.

DETAILED DESCRIPTION OF THE INVENTION

The present invention is described in detail below.
The hydrotalcite-based compound particles according to the first aspect of the present invention are surface-treated with an organic compound having not less than 3 carbon atoms, and have a specific surface area of 5 to 150 m$^2$/g, a conceptual value x of 0.035 to 0.60 and a conceptual value y of 0.22 to 0.30, wherein the conceptual value x corresponds to x represented by the following formula:

$$x=(P/(V\times(P_0-P)))/(P/P_0)$$

(wherein V is a water vapor adsorption; P is a pressure at a measuring position; and $P_0$ is an atmospheric pressure), and the conceptual value y corresponds to y represented by the following formula:

$$y=V_m/S_{SET}$$

(wherein $V_m$ is a water vapor adsorption at $P/P_0=0.2$; and $S_{SET}$ is a specific surface area of the sample), in which the values x and y are determined from a water vapor adsorption curve thereof in a range where $P/P_0$ is 0.045 to 0.355 when exposed to a temperature of 25° C. and a humidity of 50% for 250 hours.

The hydrotalcite-based compound particles surface-treated with an organic compound having not less than 3 carbon atoms of the present invention, have a specific surface area of 5 to 150 m²/g, preferably 5 to 148 m²/g, more preferably 5 to 145 m²/g.

The hydrotalcite-based compound particles having a specific surface area of less than 5 m²/g tend to be difficult to industrially produce. When the specific surface area of the hydrotalcite-based compound particles is more than 150 m²/g, such hydrotalcite-based compound particles tend to be readily attacked by halogens and readily dissolved, and therefore, are unusable practically.

In the hydrotalcite-based compound particles of the present invention, the conceptual value x corresponding to the volumes of micropores and ultramicropores thereof is in the range of 0.035 to 0.60, preferably 0.04 to 0.60, more preferably 0.06 to 0.59, and the conceptual value y corresponding to the volumes of macropores and micropores thereof is in the range of 0.22 to 0.30, preferably 0.22 to 0.28, more preferably 0.225 to 0.260. The conceptual value x corresponding to the volumes of micropores and ultramicropores, and the conceptual value y corresponding to volumes of macropores and micropores are parameters showing a resistance to attack by acids or halogens against the surface of the hydrotalcite-based compound particles as well as parameters showing a capability of capturing halogens or other anions.

When the conceptual value x is less than 0.035, the hydrotalcite-based compound particles have a too large exposed surface and, therefore, tend to be readily attacked by halogens. When the conceptual value x is more than 0.60, it may be extremely difficult to contact the hydrotalcite-based compound particles with halogens.

When the conceptual value y is more than 0.30, the hydrotalcite-based compound particles have a too large exposed surface and, therefore, tend to be readily attacked by halogens. When the conceptual value y is less than 0.22, it may be extremely difficult to contact the hydrotalcite-based compound particles with halogens, thereby failing to attain a good halogen-capturing performance as required.

The hydrotalcite-based compound particles of the present invention are provided on the surface thereof with an appropriate amount of micropores and ultramicropores, thereby enabling the particles to exhibit a halogen-capturing performance to a maximum extent.

The above-mentioned conceptual values x and y are referred to ADSORPTION, author: Keii TOMINAGA, published by Kyoritsu Shuppan Co., Ltd. (1965). Meanwhile, the macropores mean pores having sizes of usually not less than 50 nm, the micropores may include mesopores and mean pores having sizes of usually from more than 2 to less than 50 nm and the ultramicropores mean pores having sizes of usually not more than 2 nm.

The hydrotalcite-based compound particles of the present invention have an average plate surface diameter of usually 0.05 to 1.0 µm, preferably 0.1 to 0.8 µm more preferably 0.11 to 0.6 µm. When the average plate surface diameter of the hydrotalcite-based compound particles is less than 0.05 µm, the hydrotalcite-based compound particles have a too large exposed surface and, therefore, tend to be readily attacked by halogens. When the average plate surface diameter of the hydrotalcite-based compound particles is more than 1.0 µm, it may be difficult to industrially produce such hydrotalcite-based compound particles. Further, the specific surface area value of the hydrotalcite-based compound particles relative to an interlaminar sectional area thereof for capturing halogens tends to be lowered, resulting in a less contact with halogens and a less opportunity for capturing the halogens, and therefore, such hydrotalcite-based compound particles have a poor halogen-capturing performance.

The hydrotalcite-based compound particles of the present invention have a crystallite size of usually 100 to 700 Å, preferably 110 to 700 Å, more preferably 115 to 700 Å when determined from the Scherrer's formula using results of X-ray diffraction measurement. When the crystallite size of the hydrotalcite-based compound particles is less than 100 Å, the hydrotalcite-based compound particles have a too large exposed surface and, therefore, tend to be readily attacked by halogens. The hydrotalcite-based compound particles having a crystallite size of more than 700 Å may be difficult to industrially produce.

Agglomerated particles of the hydrotalcite-based compound particles of the present invention have a maximum particle diameter of usually more than 0 to 25 µm, preferably 10 to 24 µm and more preferably 11 to 23 µm as measured by a particle size distribution measuring method according to JIS R 1622. When the particle diameter of the agglomerated particles is more than 25 µm, such particles tend to be deteriorated in dispersibility in resins, thereby failing to exhibit effects of stabilizing the resins and preventing deterioration of the resins, and further failing to exhibit a sufficient effect of capturing anions from solutions and gases.

The agglomerated particles of the hydrotalcite-based compound particles have $D_{50}$ (average particle diameter at cumulative 50% in particle size distribution of the agglomerated particles of the hydrotalcite-based compound particles as measured by a particle size distribution measuring method according to JIS R 1622) of usually 0.04 to 5.0 µm, preferably 0.08 to 4.8 µm.

The hydrotalcite-based compound particles to be surface-treated are not particularly limited, and may include, for example, Mg—Zn—Al-based hydrotalcite-type particles represented by the following formula:

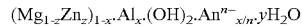
$$(Mg_{1-z}Zn_z)_{1-x}\cdot Al_x\cdot(OH)_2\cdot An^{n-}{}_{x/n}\cdot yH_2O$$

(wherein x is a number of 0.2 to 0.5 (0.2·x·0.5); z is a number of 0.003 to 0.6 (0.003·z·0.6); y is a number of from more than 0 to 2 (0<y·2); and $An^{n-}$ is a n-valent anion).

Examples of the organic compound having not less than 3 carbon atoms as the surface-treating agent may include oleic acid, metal salts of oleic acid, lauric acid, metal salts of lauric acid, stearic acid, metal salts of stearic acid, palmitic acid, glycerol, ethyleneglycol, propyleneglycol, malic acid, succinic acid, silane-based coupling agents, titanium-based coupling agents, aluminum-based coupling agents, linoleic acid, fumaric acid, tartaric acid, vinyl chloride, polyethylene, polyvinyl alcohol, lactic acid, acetic anhydride, maleic acid, methacrylic acid, acrylic acid, cyclohexane, rosins, maltose, glutamic acid and salicylic acid. Among these organic compounds, preferred are oleic acid, metal salts of oleic acid, lauric acid, metal salts of lauric acid, stearic acid, metal salts of stearic acid, silane-based coupling agents, titanium-based coupling agents, aluminum-based coupling agents and rosins.

The amount of the surface-treating agent coated on the surface of the hydrotalcite-based compound particles of the present invention is not particularly limited, because the conceptual values x and y determined from measurement of a water vapor adsorption thereof vary depending upon kinds and amounts of the surface-treating compounds used. But, the amount of the surface-treating agent coated is usually from more than 0 to 10% by weight, preferably 0.005 to 8% by weight and more preferably 0.01 to 5% by weight.

Next, the process for producing the hydrotalcite-based compound particles according to the present invention is described.

The hydrotalcite-based compound particles surface-treated with an organic compound having not less than 3 carbon atoms of the present invention may be produced by previously producing hydrotalcite-based compound particles by an ordinary method and then surface-treating the thus obtained particles with an organic compound having not less than 3 carbon atoms.

The hydrotalcite-based compound particles to be treated may be produced by an ordinary method. For example, the hydrotalcite-based compound particles to be treated may be produced by a method of mixing various raw materials with each other and then heating the resultant mixture, a hydrothermal synthesis method, a method of subjecting respective raw oxides and/or composite oxides to reconstruction method, etc.

The surface treatment used for obtaining the hydrotalcite-based compound particles of the present invention may be conducted by various methods. In any of the methods, it is required to control conditions of ultramicropores, micropores and macropores in the hydrotalcite-based compound particles. These conditions of ultramicropores, micropores and macropores may be analyzed by measuring a water vapor adsorption of the hydrotalcite-based compound particles. For example, as to the ultramicropores and micropores, the volumes thereof may be determined according to the following formula:

$$x=(P/(V\times(P_0-P)))/(P/P_0)$$

(wherein V is a water vapor adsorption; P is a pressure at a measuring position; and $P_0$ is an atmospheric pressure), which formula is derived from a water vapor adsorption curve of the hydrotalcite-based compound particles in a range where $P/P_0$ is 0.045 to 0.355 when exposed to a temperature of 25° C. and a humidity of 50% for 250 hours.

In addition, as to the micropores and macropores, a total volume thereof may be determined according to the following formula:

$$y=V_m/S_{SET}$$

(wherein $V_m$ is a water vapor adsorption at $P/P_0=0.2$; and $S_{SET}$ is a specific surface area of the sample), which formula is derived from a water vapor adsorption curve of the hydrotalcite-based compound particles in a range where $P/P_0$ is 0.045 to 0.355 when exposed to a temperature of 25° C. and a humidity of 50% for 250 hours.

The amount of the surface-treating agent added to the hydrotalcite-based compound particles is usually from more than 0 to 10% by weight, preferably 0.005 to 8% by weight, more preferably 0.01 to 5% by weight (calculated as carbon) on the basis of the weight of the hydrotalcite-based compound particles.

The surface treatment of the hydrotalcite-based compound particles may be conducted as follows. For example, in the case where a water-soluble oleic acid metal salt or stearic acid metal salt is used as the surface-treating organic compound, a solution containing the oleic acid metal salt or stearic acid metal salt in an amount of usually from more than 0 to 1.5% by weight as a solid content is dropped into a dilute slurry prepared by diluting a slurry obtained after production of the hydrotalcite-based compound particles with water at a dilution percentage of usually 20 to 200%, and then immediately after aging the resultant slurry for usually 15 to 30 min, the resultant particles are washed with water.

When the above respective conditions are out of the above-specified ranges, the surface treatment is not conducted as required, so that it may be difficult to obtain the hydrotalcite-based compound particles aimed by the present invention. For example, when the aging time of the surface-treating agent is prolonged, oleic acid anions or stearic acid anions tend to be not only applied onto the surface of the hydrotalcite-based compound particles but also introduced into an interlaminar space of the hydrotalcite-based compound particles, resulting in deviation of the conceptual values x and y determined from the water vapor adsorption, from the above-specified ranges as well as failure to stabilize various resins, and poor anion-capturing performance.

In the case where a linear hydrocarbon-based carboxylic acid compound such as stearic acid and oleic acid is used as the surface-treating agent, a solution prepared by dissolving the carboxylic acid compound in an organic solvent such as diethyl ether is preferably applied onto the surface of particles, a cake or a molded product of the hydrotalcite-based compound particles which are kept under a dried or undried condition after treating the particles with a stearic acid metal salt or an oleic acid metal salt. Further, when various coupling agents are used as the surface-treating agent, a solution prepared by diluting the coupling agent with ethanol, etc., to a concentration of not more than 1/10 time the original concentration, is preferably applied onto the surface of particles, a cake or a molded product of the hydrotalcite-based compound particles which are kept under a dried or undried condition after treating the particles with a stearic acid metal salt or an oleic acid metal salt, by spray-coating or by using a Henschel mixer, a sand mill, a high-speed mixer, a kneader, etc.

When the surface-treating organic compound having not less than 3 carbon atoms other than the above organic compounds is used as the surface-treating agent, after adhering the organic compound onto the hydrotalcite-based compound particles, the resultant particles are desirably treated by using a Henschel mixer, a sand mill, a high-speed mixer, a kneader, etc.

The macropores, micropores and ultramicropores in the hydrotalcite-based compound particles can be well controlled only by the above method, thereby enabling production of the hydrotalcite-based compound particles of the present invention.

Next, the resin stabilizer according to the second aspect of the present invention is described. The resin stabilizer of the present invention comprises the hydrotalcite-based compound particles according to the first aspect of the present invention and a metal soap compound, and may contain an additive.

More specifically, The resin stabilizer of the present invention comprises the hydrotalcite-based compound particles according to the first aspect of the present invention and a metal soap compound, and may contain at least one additive selected from the group consisting of a resin, a lubricant, a plasticizer, calcium carbonate, titanium oxide, silicon oxide, aluminum oxide, iron oxide, zeolite, a polyhydric alcohol, a hindered amine compound, a polyol, zinc dehydroacetate, β-diketone, an antioxidant, etc.

The amount of the hydrotalcite-based compound particles contained in the resin stabilizer of the present invention is usually 2.5 to 15,000 parts by weight, preferably 5.5 to 8,000 parts by weight, more preferably 13 to 7,000 parts by weight based on 100 parts by weight of the metal soap compound.

Examples of the resin may include, in addition to vinyl chloride resins, polyolefin resins, polyamide resins, vinyl acetate resins, polyimide resins, polystyrol and polypropylene resins. In particular, the vinyl chloride resin solely or a mixed resin composed of the vinyl chloride resin as a main component and at least one kind of the other resin is preferably used.

Examples of the metal soap may include zinc stearate, calcium stearate, magnesium stearate, sodium stearate, potassium stearate, lead stearate, lithium stearate, barium stearate, aluminum stearate, zinc 1,2-hydroxystearate, calcium 1,2-hydroxystearate, magnesium 1,2-hydroxystearate, aluminum 1,2-hydroxystearate, barium 1,2-hydroxystearate, lithium 1,2-hydroxystearate, sodium 1,2-hydroxystearate, calcium montanate, zinc montanate, magnesium montanate, aluminum montanate, lithium montanate, sodium montanate, calcium behenate, zinc behenate, magnesium behenate, lithium behenate, sodium behenate, silver behenate, calcium laurate, zinc laurate, barium laurate, lithium laurate, aluminum octanoate, sodium sebacate, zinc undecylenate, zinc ricinolate, barium ricinolate, zinc myristate and zinc palmitate.

Examples of the lubricant may include internal lubricants such as butyl stearate, stearyl alcohol, glycerol fatty esters and sorbitan fatty esters; and external lubricants such as stearic acid, ester waxes, ethylenebisstearylamide, polyethylene waxes and paraffin waxes.

Examples of the plasticizer may include di-2-ethylhexyl phthalate, diisononyl phthalate, diisodecyl phthalate, di-n-octyl phthalate, tricresyl phosphate, epoxidated soybeans, trioctyl trimellitate, polyester-based plasticizers and chlorinated paraffin plasticizers.

Examples of the polyhydric alcohol may include glycerol, ethyleneglycol, diethyleneglycol, trimethylol propane, trimethylol ethane, pentaerythritol, cyclohexane dimethanol, 1,3-propanediol, 1,2-propanediol, 1,4-butanediol, 1,3-butanediol, 1,2-butanediol, 1,5-hexanediol, 1,6-hexanediol, 2-ethyl-1,3-hexanediol, 3-methyl-1,5-pentanediol, 1,8-octanediol, 1,2-octanediol, 1,9-nonanediol, 2-methyl-1,8-octanediol, 2,2-isopropylenebis(4-hydroxycyclohexane) and 2,2,4-trimethyl-1,3-pentanediol.

Examples of the hindered amine compound may include 2,2,6,6-tetramethyl-4-piperidyl benzoate, 1,2,2,6,6-pentamethyl-4-piperidyl stearate, bis(1,2,2,6,6-pentamethyl-4-piperidyl)sebacate, bis(2,2,6,6-tetramethyl-4-piperidyl)sebacate, bis(1,2,2,6,6-pentamethyl-4-piperidyl).di(tridecyl)-1,2,3,4-butanetetracarboxylate, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane, a polycondensate of 1-(2-hydroxyethyl)-2,2,6,6-tetramethyl-4-piperidinol and diethyl succinate, a polycondensate of 1,6-bis(2,2,6,6-tetraethyl-4-piperidylamino)hexane and dibromoethane, a polycondensate of 1,6-bis(2,2,6,6-tetramethyl-4-piperidylamino)hexane and 2,4-dichloro-6-morpholino-s-triazine, a polycondensate of 1,6-bis(2,2,6,6-tetramethyl-4-piperidylamino)hexane and 2,4-dichloro-6-t-octylamino-s-triazine, 2,2,6,6-tetramethyl-4-piperidyl stearate, 1,5,8,12-tetrakis[2,4-bis(N-butyl-N-(2,2,6,6-tetramethyl-4-piperidyl)amino)-s-triazine-6-yl]-1,5,8,12-tetraazadecane, tetrakis(2,2,6,6-tetramethyl-4-piperidyl)butane tetracarboxylate, 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5]undecane, 1,5,8,12-tetrakis[2,4-bis(N-butyl-N-(1,2,2,6,6-pentamethyl-4-piperidyl)amino)-s-triazin-6-yl]-1,5,8,12-tetraazadecane, bis(1,2,2,6,6-pentamethyl-4-piperidyl)-2-butyl-2-(3,5-di-t-butyl-4-hydroxybenzyl)malonate, 1,6,11-tris[2,4-bis(N-butyl-N-(2,2,6,6-tetramethyl-4-piperidyl)amino)-s-triazine-6-yl-amino]undecane, 1,6,11-tris[2,4-bis(N-butyl-N-(1,2,2,6,6-pentamethyl-4-piperidyl)amino)-s-triazin-6-yl-amino]undecane and tetrakis(1,2,2,6,6-pentamethyl-4-piperidyl)butane tetracarboxylate.

Examples of the polyol may include glycerol, dipentaerythritol, pentaerythritol, a stearic half ester of pentaerythritol or dipentaerythritol, trimethylol propane, ditrimethylol propane, polypentaerythritol, bis(dipentaerythritol)adipate and tris(2-hydroxyethyl)isocyanurate.

Examples of the antioxidant may include 4,4'-thiobis-(6-t-butyl-m-cresol), 2,2'-methylenebis(4-methyl-6-t-butyl phenol), 4,4'-butylidenebis(2,6-di-t-butyl phenol), 4,4'-butylidenebis(6-t-butyl-3-methyl phenol), 2,2'-ethylidenebis(4,6-di-t-butyl phenol), 1,1,3-tris(2-methyl-4-hydroxy-5-t-butylphenyl)butane, stearyl(3,5-di-t-butyl-4-hydroxyphenyl)propionate, thiodiethylenebis[(3,5-di-t-butyl-4-hydroxyphenyl)propionate], 1,3,5-tris[(3,5-di-t-butyl-4-hydroxyphenyl)propionyloxyethyl]isocyanurate, tetrakis[methylene-3-(3',5'-di-t-butyl-4'-hydroxyphenyl)propionate]methane, 3,9-bis[2-(3-t-butyl-4-hydroxy-5-methylhydroxycinnamyloxy)-1,1-dimethylethyl]-2,4-8,10-tetraoxaspiro[5.5]undecane, triethyleneglycolbis[β-(3-t-butyl-4-hydroxy-5-methylphenyl)propionate], triphenyl phosphite, tris(2,4-di-t-butylphenyl)phosphite, tris(2,5-di-t-butylphenyl)phosphite, tris(nonylphenyl)phosphite, tris(dinonylphenyl)phosphite, tris(mono- and di-mixed nonylphenyl)phosphite, diphenyl acid phosphite, 2,2'-methylenebis(4,6-di-t-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentylglycol).1,4-cyclohexanedimethyl diphosphite, bis(2,4-di-t-butylphenyl)pentaerythritol diphosphite, bis(2,5-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, distearyl pentaerythritol diphosphite, tetra(C12 to C15-mixed alkyl)-4,4'-isopropylidenediphenyl phosphite, bis[2,2'-methylenebis(4,6-di-amylphenyl)].isopropylidenediphenyl phosphite, tetratridecyl.4,4'-butylidenebis(2-t-butyl-5-methylphenol) diphosphite, hexa(tridecyl).1,1,3-tris(2-methyl-5-t-butyl-4-hydroxyphenyl)butane.triphosphite, tetrakis(2,4-di-t-butylphenyl)biphenylene diphosphite, tris(2-[(2,4,7,9-tetrakis-t-butyldibenzo[d,f][1,3,2]dioxaphosphepin-6-yl)oxy]ethyl)amine, 9,10-dihydro-9-oxa-10-phosphaphenathrene-10-oxide, 2-butyl-2-ethyl propanediol.2,4,6-tri-t-butylphenol monophosphite, dialkyl thiodipropionates such as dilauryl, dimyristyl, myristyl stearyl and distearyl esters of thiodipropionic acid, and β-alkylmercaptoproiponic acid esters of polyols such as pentaerythritol tetra(β-dodecylmercaptopropionate).

Next, the halogen-containing resin composition according to the third aspect of the present invention is described. The halogen-containing resin composition according to the third aspect of the present invention comprises usually 0.01 to 30 parts by weight of the hydrotalcite-based compound particles according to the first aspect of the present invention, and 100 parts by weight of a halogen-containing resin.

The amount of the hydrotalcite-based compound particles contained in the resin composition is usually 0.01 to 30 parts by weight, preferably 0.02 to 25 parts by weight on the basis of 100 parts by weight of the halogen-containing resin.

As the resin, the afore-mentioned resin may be exemplified. For exampled, vinyl chloride resins, polyolefin resins, polyamide resins, vinyl acetate resins, polyimide resins, polystyrol and polypropylene resins may be used. In particular, the vinyl chloride resin solely or a mixed resin composed of the vinyl chloride resin as a main component and at least one kind of the other resin is preferably used.

The halogen-containing resin composition according to another embodiment of the present invention comprises usually 0.01 to 30 parts by weight of the hydrotalcite-based compound particles according to the first aspect of the present invention, 100 parts by weight of a halogen-containing resin, usually 0 to 70 parts by weight of a plasticizer and usually 0.05 to 50 parts by weight of metal soap compound.

The amount of the plasticizer contained in the resin composition is usually 0 to 70 parts by weight, preferably 0 to 65 parts by weight, more preferably 0 to 60 parts by weight based on 100 parts by weight of the halogen-containing resin. The amount of the metal soap compound contained in the resin composition is usually 0.05 to 50 parts by weight, preferably 0.08 to 40 parts by weight, more preferably 0.1 to 38 parts by weight based on 100 parts by weight of the halogen-containing resin.

The above halogen-containing resin composition can exhibit a high transparency and a good thermal stability, and can be prevented from suffering from initial coloration.

In the hydrotalcite-based compound particles of the present invention, an adequate amount of micropores and ultramicropores which are untreated or uncoated with the organic compound having not less than 3 carbon atoms, still remain on the surface thereof. Therefore, the hydrotalcite-based compound particles can exhibit a halogen-capturing performance to a maximum extent, and can fully show a resistance to attack by halogens generated from the halogen-containing resin due to heating upon processing the resin. In addition, since the surface of the hydrotalcite-based compound particles is appropriately hydrophobilized and coated with the organic compound, the hydrotalcite-based compound particles can exhibit a high dispersibility in the halogen-containing resin upon processing the resin together with the particles, thereby providing an excellent halogen-containing resin composition having a high thermal stability which can be prevented from suffering from initial coloration.

Further, since the hydrotalcite-based compound particles have substantially the same refractive index as that of the halogen-containing resin, the resultant resin composition can exhibit a high transparency. Also, the transparency of the halogen-containing resin composition can be further enhanced by controlling a molar ratio between $M^{2+}$ and $M^{3+}$ and the water content y in the above chemical formula of the hydrotalcite-based compound particles.

In addition, the halogen-containing resin composition according to a further embodiment of the present invention comprises usually 0.01 to 30 parts by weight of the hydrotalcite-based compound particles according to the first aspect of the present invention, 100 parts by weight of a halogen-containing resin, usually 0 to 70 parts by weight of a plasticizer, usually 0.05 to 50 parts by weight of metal soap compound, and usually 1 to 50 parts by weight of calcium carbonate and/or titanium dioxide.

The above halogen-containing resin composition are more excellent in thermal stability and the effect of preventing occurrence of initial coloration.

The amount of the calcium carbonate and/or titanium dioxide contained in the resin composition is usually 1 to 50 parts by weight, preferably 1 to 48 part by weight, more preferably 1.2 to 45 parts by weight based on 100 parts by weight of the halogen-containing resin.

The hydrotalcite-based compound particles according to the present invention can exhibit an excellent effect of preventing polyolefin resins or polyamide resins from being deteriorated by adding the particles to these resins. That is, the halogen scavenger according to the forth aspect of the present invention serves for capturing a very small amount of halogens contained in polyolefins resins and/or halogens generated from halogen-based additives contained in the resins, and is composed of the hydrotalcite-based compound particles according to the first aspect of the present invention.

More specifically, upon producing polyolefin resins such as polyethylene and polypropylene by polymerization, titanium chloride is used as a Ziegler-Natta catalyst. Notwithstanding chloride contained in the catalyst is present in an extremely small amount in the resin, the deterioration of the resin is strongly accelerated by the chloride upon thermal processing of the polyolefin resins. The hydrotalcite-based compound particles of the present invention are provided on the surface thereof with an adequate amount of micropores and ultramicropores which still remain untreated or uncoated with the organic compound having not less than 3 carbon atoms, and therefore, not only can exhibit a chlorine-capturing effect to a maximum extent, but also can fully show a resistance to attack by chlorine generated from the polyolefin resins due to heating upon processing the resins. Further, since the surface of the hydrotalcite-based compound particles is appropriately hydrophobilized and coated with the organic compound, the hydrotalcite-based compound particles can exhibit a high dispersibility in the polyolefin resins upon processing the resins together with the particles, thereby attaining an excellent effect of preventing deterioration of the polyolefins.

Also, when imparting a flame retardancy to polyamide resins, a halogen-based flame retardant may be added thereto. Examples of the halogen-based flame retardant may include aromatic halogen compounds, halogenated epoxy resins, halogenated polycarbonates, halogenated aromatic vinyl-based copolymers, halogenated cyanurate resins and halogenated polyphenylene ethers. Specific examples of the flame retardant may include decabromodiphenyloxide, 1,2-(pentabromophenyl)ethane, pentabromobenzyl polyacrylates, tetrabromobisphenol A, oligomers of tetrabromobisphenol A, brominated bisphenol-based epoxy resins, brominated bisphenol-based phenoxy resins, brominated bisphenol-based polycarbonates, brominated polystyrenes, brominated crosslinked polystyrenes, polypenta-brominated benzyl-based acrylic resins, brominated polyphenyleneoxide, polydibromophenyleneoxide, a condensate of decabromodiphenyloxide and bisphenol, and halogen phosphoric esters.

When polyamide resins containing these halogen-based flame retardants are heated or processed, a part of the halogen-based flame retardants is decomposed to generate halogens, so that the deterioration of the polyamide resins tends to be accelerated, thereby causing defects such as black spots on processed products.

The hydrotalcite-based compound particles of the present invention are provided on the surface thereof with an adequate amount of micropores and ultramicropores which still remain untreated or uncoated with the organic compound having not less than 3 carbon atoms, and therefore, not only can exhibit a chlorine-capturing effect to a maximum extent, but also can fully show a resistance to attack by chlorine generated from the polyamide resins due to heating upon processing the resins. Further, since the surface of the hydrotalcite-based compound particles is appropriately hydrophobilized and coated with the organic compound, the hydrotalcite-based compound particles can exhibit a high dispersibility in the polyamide resins, etc., upon processing the resins together with the particles, thereby attaining an excellent effect of preventing heat-deterioration of the polyamide resins.

The above polyamide resins are preferably thermoplastic resins. Examples of the polyamide resins may include nylon 6, nylon 46, nylon 66, nylon 69, nylon 610, nylon 6/66, nylon 612, nylon 611, nylon 11, nylon 12, nylon 61, nylon 6T/6I, nylon 66/6T, polybis(4-aminocyclohexyl)methanedodecamido(nylon PACM12), polybis(3-methyl-4-aminocyclohexyl)methanedodecamido(nylon dimethyl PACM12), poly-m-xyleneadipamide (MXD6), polyundecamethyleneterephthalamido(nylon 11T) and polyundecamethylenehexahydroterephthalamido(nylon 11T(H)) (wherein I represents isophthalic acid, and T represents terephthalic acid). The polyamide resin may be in the form of a mixture of any two or more of the above nylons or a copolymer thereof.

The anion scavenger for capturing anions from a solution according to the fifth aspect of the present invention is obtained by processing the hydrotalcite-based compound particles according to the first aspect of the present invention into particles or a molded product.

The molded product means those products obtained by coating the hydrotalcite-based compound particles onto a molded product made of cordierite, etc., those products obtained by molding the hydrotalcite-based compound particles solely or a mixture of the hydrotalcite-based compound particles and known additives added thereto according to requirements such as silicone oxides, aluminum oxides, aluminum hydroxides, or the like. The shape of the molded product is not particularly limited, and may be of any shape such as a honeycomb shape, a column shape, a cylindrical shape, a spherical shape, etc.

Examples of the solution to be treated with the hydrotalcite-based compound particles for capturing anions contained therein may include waste liquids containing inorganic anions such as phosphates, nitrates, sulfates, etc., and/or waste liquids containing organic anions such as soap anion salts, anion dyes, etc.

The conditions for capturing anions contained in the solution to be treated are not particularly limited. For example, the temperature of the solution to be treated is usually 0 to 80° C., preferably 5 to 75° C., and the pH value of the solution to be treated is usually 6 to 14, preferably 6.5 to 13.

The point of the present invention is that when the values x and y determined from a water vapor adsorption curve of the hydrotalcite-based compound particles whose surface is coated with an organic compound having not less than 3 carbon atoms when the hydrotalcite-based compound particles are exposed to a temperature of 25° C. and a humidity of 50% for 250 hours, are fallen within specific ranges, such hydrotalcite-based compound particles can exhibit excellent effects of not only imparting a high thermal stability to resins, but also preventing initial coloration of the resins.

In the hydrotalcite-based compound particles according to the present invention, the conceptual value x corresponding to pore volumes of micropores and ultramicropores therein is in the range of 0.035 to 0.60, and the conceptual value y corresponding to pore volumes of macropores and micropores is in the range of 0.22 to 0.30. The reason of controlling the respective conceptual values x and y to the above-specified ranges, is not only to impart a good resistance to attack by acids, halogens, etc., to the hydrotalcite-based compound particles themselves, but also to minimize deterioration of their capability of capturing halogens or other anions.

The hydrotalcite-based compound particles according to the present invention are provided on the surface thereof with an adequate amount of micropores and ultramicropores which still remain untreated or uncoated portions with the organic compound having not less than 3 carbon atoms and, therefore, can exhibit not only a halogen-capturing performance to a maximum extent, but also a sufficient resistance to attack by halogens generated from halogen-containing resins due to heating upon processing the resins. In addition, since the surface of the hydrotalcite-based compound particles of the present invention is appropriately coated with an organic compound (a hydrophobilizing agent), the hydrotalcite-based compound particles of the present invention can exhibit a high dispersibility in the halogen-containing resins upon processing the resins together with the particles, so that the resultant halogen-containing resin composition can be imparted with a high thermal stability and can be prevented from suffering from initial coloration. Such halogen-containing resin composition can be suitably applied, in particular, to electric cables, etc.

When appropriately selecting the kind and amount of the surface-treating agent composed of the organic compound having not less than 3 carbon atoms which are optimum for attaining the molar ratio of divalent element and/or monovalent element to trivalent element contained in hydrotalcite, the size of the hydrotalcite-based compound particles and the size of agglomerated particles thereof as required, an adequate amount of micropores and ultramicropores can be present on the surface of the particles, so that the hydrotalcite-based compound particles can exhibit a halogen-capturing performance to a maximum extent.

By using the hydrotalcite-based compound particles according to the present invention, there can be provided a halogen-containing resin composition having an excellent thermal stability which can be prevented from suffering from initial coloration, or a resin stabilizer capable of imparting an excellent thermal stability to resins and preventing initial deterioration of the resins. Also, the hydrotalcite-based compound particles of the present invention can enhance the effect of preventing deterioration of various resins. Further, the hydrotalcite-based compound particles of the present invention are useful as a scavenger for capturing anions contained in a solution.

Since the macropores, micropores and ultramicropores being present on the hydrotalcite-based compound particles of the present invention are controlled to the specific ranges, the hydrotalcite-based compound particles can impart an excellent thermal stability to halogen-containing resins and prevent initial coloration of the resins.

In addition, the hydrotalcite-based compound particles of the present invention are very useful for capturing a very small amount of halogens contained in various resins such as polyolefins and polyamides.

Further, the hydrotalcite-based compound particles of the present invention can exhibit an excellent capability of capturing anions contained in a solution and, therefore, is useful as an anion scavenger for capturing anions being present in the solution.

EXAMPLES

The present invention is described in more detail by Examples, but these Examples are only illustrative and, therefore, not intended to limit the scope of the present invention.

(1) The BET specific surface area was measured by a B.E.T. method using nitrogen.

(2) The water vapor adsorption was measured using an automatic water vapor adsorption measuring apparatus "BELSORP18" manufactured by Nippon Bell Co., Ltd.

(3) The plate surface diameter of the hydrotalcite-based compound particles was measured using a transmission type electron microscope "JEM-1200EXII" manufactured by Nippon Denshi Co., Ltd.

(4) The crystallite size of the hydrotalcite-based compound particles was calculated from data measured using a powder X-ray diffractometer "RINT2500" manufactured by Rigaku Co., Ltd., according to the Scherrer's formula:

$$p \text{ (nm)} = 180 K\lambda/\pi X$$

(wherein p represents a crystallite size; K represents a Scherrer constant (calculation was made as K=0.9); λ represents a wavelength of X-ray used; π represents a ratio of the circumference of a circle to the diameter; and X represents a Lorentz parameter (object profile parameter)). Meanwhile, the X-ray diffraction plane used for the calculation was a d (006) plane of hydrotalcite, and the kind of radiation source was Cu.

(5) The particle size distribution of the surface-treated hydrotalcite-based compound particles was measured according to JIS R 1622 using a micro-track particle size distribution measuring apparatus "9320HRA(X-100)" manufactured by Nikkiso Co., Ltd. Upon dispersing the particles, 0.7 g of the particles as a sample were weighed and charged into a glass bottle having a barrel diameter of 31 mmϕ, and 5 mL of ethanol as a guaranteed reagent and 70 mL of a 0.2 wt % sodium hexametaphosphate aqueous solution were added thereto. The thus obtained mixture was subjected to ultrasonic irradiation treatment for 3.0 min using an ultrasonic homogenizer "US-150T" (manufactured by Nippon Seiki Co., Ltd.) having an output power of 150 W and a tip size of 20 mmϕ by setting the tip position at 5.5 mm. 2.0 mL of the resultant dispersion was sampled and dropped into the micro-track particle size distribution measuring apparatus through which pure water was circulated. After allowing the dispersion to be circulated through the apparatus for 180 sec, the particle size distribution of the particles contained therein was measured. The measurement of the particle size distribution of the sample particles was conducted at least two times. From the measurement results, the maximum particle diameter and $D_{50}$ as an average particle diameter at cumulative 50% in the particle size distribution were determined.

Example 1

Production of Hydrotalcite 73.3 g of $Mg(NO_3)_2 \cdot 6H_2O$ and 42.9 g of $Al(NO_3)_3 \cdot 9H_2O$ were dissolved in water to prepare 600 mL of an aqueous solution. Separately, 60 mL of a NaOH solution (concentration: 14 mol/L) and a solution containing 10.5 g of $NaCO_3$ were mixed with each other to prepare 400 mL of a mixed alkali solution. The above mixed aqueous solution containing the magnesium salt and the aluminum salt was added to the thus prepared mixed alkali solution, and the resultant solution was aged at 150° C. for 5 hours and diluted with water to 50% f. Then, a solution separately prepared by dissolving sodium stearate in 500 mL of water was charged at 65° C. in an amount of 2.0% by weight based on the weight of hydrotalcite into the thus obtained diluted solution, and the resultant mixture was aged at 65° C. The obtained particles were separated by filtration, dried at 135° C. and then subjected to coarse pulverization using a Taninaka type pulverizer. After adding a silane coupling agent to the coarsely pulverized particles, the particles were pulverized for 3 min using a Taninaka type pulverizer, and then after adding glycerol thereto, the particles were further pulverized for 3 min using a Taninaka type pulverizer. At this time, the amounts of the silane coupling agent and glycerol added were 0.12% by weight and 0.05% by weight, respectively.

As a result, it was confirmed that the thus obtained surface-treated hydrotalcite-based compound particles had a specific surface area of 14.2 m²/g and a crystallite size of 534 Å; an average plate surface diameter of 0.25 μm, conceptual values x and y as calculated from a water vapor adsorption thereof were 0.2545 and 0.2550, respectively; and agglomerated particles thereof had a maximum particle diameter of 15.2 μm and $D_{50}$ of 2.22 μm.

<Halogen-Containing Resin Composition Using Halogen-Containing Resin Stabilizer>

Using the above hydrotalcite-based compound particles, there was prepared a vinyl chloride resin composition using a vinyl chloride resin stabilizer. The components of the vinyl chloride resin composition are as follows.

| | |
|---|---|
| Vinyl chloride resin ("TK-1300" produced by Shin-Etsu Kagaku Kogyo Co., Ltd.; polymerization degree: 1300) | 100 parts by weight |
| Bis(2-ethylhexyl) phthalate (produced by Dai-Hachi Kagaku Kogyo Co., Ltd.) | 50 parts by weight |
| Zinc stearate (reagent) | 0.5 part by weight |
| Hydrotalcite-based compound particles | 2 parts by weight |

The respective components mentioned above were mixed with each other. 50 g of the thus obtained mixture was kneaded for 4 min using hot rolls at 160° C. by setting a clearance between the rolls to 0.75 mm, thereby obtaining a sheet. The thus obtained kneaded sheet was subjected to thermal stability test according to JIS K 6723 to measure a heat-resisting time thereof. Further, the kneaded sheet was pressed by a hot press at 190° C. for 5 min and 30 min and formed into a pressed sheet having a size of 15 cm square and a thickness of 0.5 mm. The degree of coloration of the thus obtained pressed sheet was defined as an initial coloration, and the initial coloration of the pressed sheet was evaluated and expressed by five ranks A to E.

Meanwhile, Rank A represents the condition that the sheet was substantially free from coloration;

Rank B represents the condition that the sheet exhibited coloration in a fully acceptable level, i.e., colored merely very thin;

Rank C represents the condition that the sheet was slightly colored and still in acceptable level;

Rank D represents the condition that the sheet was colored but still in a boundary acceptable level; and Rank E is the condition that the sheet was severely colored and in an unacceptable level.

Example 2

73.3 g of $Mg(NO_3)_2 \cdot 6H_2O$ and 42.9 g of $Al(NO_3)_3 \cdot 9H_2O$ were dissolved in water to prepare 600 mL of an aqueous solution. Separately, 60 mL of a NaOH solution (concentration: 14 mol/L) and a solution containing 10.5 g of $NaCO_3$ were mixed with each other to prepare 400 mL of a mixed alkali solution. The above-prepared mixed aqueous solution containing the magnesium salt and the aluminum salt was added to the thus prepared mixed alkali solution, and after the resultant solution was aged at 150° C. for 5 hours, stearic acid was charged thereto in an amount of 3.8% by weight based on the weight of hydrotalcite, followed by aging the resultant mixture. The mixture was diluted with water to 50%, and the obtained particles were dried at 128° C. and then subjected to coarse pulverization using a Taninaka type pulverizer. After adding a rosin in an amount of 0.1% by weight based on the weight of hydrotalcite to the coarsely pulverized particles, the particles were pulverized for 7 min using a Taninaka type pulverizer.

As a result, it was confirmed that the thus obtained surface-treated hydrotalcite-based compound particles had a specific surface area of 14.0 $m^2/g$, an average plate surface diameter of 0.31 μm and a crystallite size of 535 Å; conceptual values x and y as calculated from a water vapor adsorption thereof were 0.5644 and 0.2328, respectively; and agglomerated particles thereof had a maximum particle diameter of 23.8 μm and $D_{50}$ of 4.67 μm.

Using the above hydrotalcite-based compound particles, there was prepared a vinyl chloride resin composition using a vinyl chloride resin stabilizer. The components of the vinyl chloride resin composition are as follows.

| | |
|---|---|
| Vinyl chloride resin ("TK-1300" produced by Shin-Etsu Kagaku Kogyo Co., Ltd.; polymerization degree: 1300) | 100 parts by weight |
| Tris(2-ethylhexyl) trimellitate ("TRIMEX" produced by Kao Co., Ltd.) | 48 parts by weight |
| Calcium carbonate | 15 parts by weight |
| Titanium dioxide | 5 parts by weight |
| Zinc stearate | 0.5 part by weight |
| Calcium stearate | 0.5 part by weight |
| Hydrotalcite-based compound particles | 4.2 parts by weight |

The respective components mentioned above were mixed with each other. 50 g of the thus obtained mixture was kneaded for 7 min using hot rolls at 160° C. by setting a clearance between the rolls to 1.0 mm, thereby obtaining a sheet. The thus obtained kneaded sheet was subjected to thermal stability test according to JIS K 6723 to measure a heat-resisting time thereof.

Further, the kneaded sheet was pressed by a hot press at 190° C. for 5 min and 30 min and formed into a pressed sheet having a size of 15 cm square and a thickness of 0.5 mm. The degree of coloration of the thus obtained pressed sheet was defined as an initial coloration, and the initial coloration of the pressed sheet was evaluated and expressed by five ranks A to E.

Meanwhile, Rank A represents the condition that the sheet was substantially free from coloration;

Rank B represents the condition that the sheet exhibited coloration in a fully acceptable level, i.e., colored merely very thin;

Rank C represents the condition that the sheet was slightly colored and still in acceptable level;

Rank D represents the condition that the sheet was colored but still in a boundary acceptable level; and Rank E is the condition that the sheet was severely colored and in an unacceptable level.

Example 3

70.2 g of $Mg(NO_3)_2 \cdot 6H_2O$, 45.3 g of $Al(NO_3)_3 \cdot 9H_2O$, 32 mL of a NaOH solution (concentration: 14 mol/L) and 13.8 g of $NaNO_3$ were reacted with each other at 170° C. for 15 hours by the same method as defined in Example 1. The thus obtained reaction solution was mixed with 1 L of water, and then a solution separately prepared by dissolving sodium stearate in 500 mL of water was added thereto at 70° C. in an amount of 1.0% by weight based on the weight of hydrotalcite, followed by aging the resultant mixture at 70° C. for 30 min. The obtained particles were separated by filtration, dried at 105° C. and then pulverized for 1 min using a Taninaka type pulverizer. After adding a rosin in an amount of 1.2% by weight based on the weight of hydrotalcite to the thus pulverized particles, the particles were further pulverized for 8 min using a Taninaka type pulverizer. As a result, it was confirmed that the thus obtained surface-treated hydrotalcite-based compound particles had a specific surface area of 8.2 $m^2/g$, an average plate surface diameter of 0.38 μm and a crystallite size of 662 Å; conceptual values x and y as calculated from a water vapor adsorption thereof were 0.3409 and 0.2335, respectively; and agglomerated particles thereof had a maximum particle diameter of 12.0 μm and $D_{50}$ of 0.2101 μm.

Using the above-obtained hydrotalcite-based compound particles, there was prepared a vinyl chloride resin composition using a vinyl chloride resin stabilizer. The components of the vinyl chloride resin composition are as follows.

| | |
|---|---|
| Vinyl chloride resin ("TK-1300" produced by Shin-Etsu Kagaku Kogyo Co., Ltd.; polymerization degree: 1300) | 100 parts by weight |
| Bis(2-ethylhexyl) phthalate (produced by Dai-Hachi Kagaku Kogyo Co., Ltd.) | 60 parts by weight |
| Calcium carbonate | 20 parts by weight |
| Zinc stearate | 0.5 part by weight |
| Calcium stearate | 0.1 part by weight |
| Hydrotalcite-based compound particles | 3.5 parts by weight |

The respective components mentioned above were mixed with each other. 50 g of the thus obtained mixture was kneaded for 7 min using hot rolls at 160° C. by setting a clearance between the rolls to 1.0 mm, thereby obtaining a sheet. The thus obtained kneaded sheet was subjected to thermal stability test according to JIS K 6723 to measure a heat-resisting time thereof.

Further, the kneaded sheet was pressed by a hot press at 190° C. for 5 min and 30 min and formed into a pressed sheet having a size of 15 cm square and a thickness of 0.5 mm. The degree of coloration of the thus obtained pressed sheet was defined as an initial coloration, and the initial coloration of the pressed sheet was evaluated and expressed by five ranks A to E.

Meanwhile, Rank A represents the condition that the sheet was substantially free from coloration;

Rank B represents the condition that the sheet exhibited coloration in a fully acceptable level, i.e., colored merely very thin;

Rank C represents the condition that the sheet was slightly colored and still in acceptable level;

Rank D represents the condition that the sheet was colored but still in a boundary acceptable level; and Rank E is the condition that the sheet was severely colored and in an unacceptable level.

Example 4

Ethylene and 1-butene were copolymerized with each other in the presence of a Ziegler-Natta catalyst such as a halogenated titanium or magnesium compound. To the thus obtained copolymer were added 0.10 part by weight of the hydrotalcite-based compound particles obtained in Example 1, 0.08 part by weight of bis(2,4-di-t-butylphenyl)pentaerythritol diphosphite and 0.10 part by weight of calcium stearate all based on 100 parts by weight of the copolymer resin. The resultant mixture was kneaded using hot rolls at 105° C. for 20 min, thereby obtaining a kneaded sheet having a thickness of 2 mm. Next, the thus obtained kneaded sheet was pressed using a hot press at 120° C. for 5 min and 30 min and formed into a pressed sheet having a thickness of 2 mm. The yellowing of the thus obtained pressed sheet was evaluated by five ranks by the same method as defined above.

Example 5

40 parts by weight of a nylon 4, 6 resin, 22 parts by weight of a (co)polymer of brominated styrene, 5 parts by weight of antimony trioxide, 1.5 parts by weight of the hydrotalcite-based compound particles obtained in Example 1 and 20 parts by weight of baked kaolin were mixed with each other. The resultant mixture was kneaded using hot rolls at 327° C. for 30 min, thereby obtaining a kneaded sheet having a thickness of 2 mm. The thus obtained kneaded sheet was observed to examine a frequency of formation of black spots thereon which was expressed by three ranks A to C. Rank A means a less number of black spots; and Rank C means a large number of black spots. At the same time, the degree of coloration of resin forming the sheet was evaluated and expressed by five ranks A to E.

Meanwhile, Rank A represents the condition that the sheet was substantially free from coloration;

Rank B represents the condition that the sheet exhibited coloration in a fully acceptable level, i.e., colored merely very thin;

Rank C represents the condition that the sheet was slightly colored and still in acceptable level;

Rank D represents the condition that the sheet was colored but still in a boundary acceptable level; and Rank E is the condition that the sheet was severely colored and in an unacceptable level.

Comparative Example 1

The same procedure as defined in Example 1 was conducted except that the kinds and amounts of the surface-treating agents for the hydrotalcite-based compound particles were changed, i.e., 5.2% by weight of sodium stearate, 0.22% by weight of a silane coupling agent and 0.1% by weight of glycerol were used, and all of the three surface treating agents were added to the hydrotalcite-based compound particles at the same time and then the obtained mixture was pulverized by a Taninaka type pulverizer for 3 min. As a result, it was confirmed that the thus obtained surface-treated hydrotalcite-based compound particles had a specific surface area of 13.6 m$^2$/g, an average plate surface diameter of 0.27 μm and a crystallite size of 536 Å; conceptual values x and y as calculated from a water vapor adsorption thereof were 0.6341 and 0.2239, respectively; and agglomerated particles thereof had a maximum particle diameter of 14.8 μm and D$_{50}$ of 2.18 μm. Using the thus obtained hydrotalcite-based compound particles, a kneaded sheet and a pressed sheet were produced by the same method as defined in Example 1 for production of a halogen-containing resin composition, and the degree of coloration of the thus obtained sheet was evaluated by five ranks by the same method as defined above.

Comparative Example 2

The same procedure as defined in Example 3 was conducted except that the dried hydrotalcite-based compound particles obtained in Example 3 whose surface was still subjected to no surface treatment, were treated with 0.9% by weight of stearic acid, 0.2% by weight of rosin and 1.5% by weight of glycerol, whereupon all of the three surface treating agents were added in a dried state to the hydrotalcite-based compound particles at the same time and then the obtained mixture was pulverized on a mortar for 1 min. As a result, it was confirmed that the thus obtained surface-treated hydrotalcite-based compound particles had a specific surface area of 7.9 m$^2$/g, an average plate surface diameter of 0.33 μm and a crystallite size of 533 Å; conceptual values x and y as calculated from a water vapor adsorption thereof were 0.1801 and 0.31, respectively; and agglomerated particles thereof had a maximum particle diameter of 24.1 μm and D$_{50}$ of 5.1 μm. Using the thus obtained hydrotalcite-based compound particles, a kneaded sheet and a pressed sheet were produced by the same method as defined in Example 3 for production of a halogen-containing resin composition, and the degree of coloration of the thus obtained sheet was evaluated by five ranks by the same method as defined above.

Comparative Example 3

The same procedure as defined in Example 4 was conducted except that the hydrotalcite-based compound particles obtained in Comparative Example 1 were used to measure a degree of yellowing thereof.

TABLE 1

| Examples and Comparative Examples | Kind of resin | Degree of coloration |
|---|---|---|
| Example 1 | Vinyl chloride resin | B |
| Example 2 | Vinyl chloride resin | A |
| Example 3 | Vinyl chloride resin | A |
| Example 4 | Ethylene-1-butene copolymer | B |
| Example 5 | Nylon 4, 6 resin/brominated styrene copolymer | B |
| Comparative Example 1 | Vinyl chloride resin | C |
| Comparative Example 2 | Vinyl chloride resin | D |
| Comparative Example 3 | Ethylene-1-butene copolymer | D |

Example 6

70.5 g of Mg(NO$_3$)$_2$.6H$_2$O, 46.9 g of Al(NO$_3$)$_3$.9H$_2$O, 52 mL of a NaOH solution (concentration: 14 mol/L) and 18.1 g of NaNO$_3$ were reacted with each other at 75° C. for 6 hours by the same method as defined in Example 1. The obtained particles were separated by filtration, dried at 90° C. and then pulverized for 1 min using a Taninaka type pulverizer. After adding a silane coupling agent diluted with ethanol to a concentration of 1/15 time the original concentration in an amount of 0.6% by weight based on the weight of hydrotalcite to the thus pulverized particles, the particles were further pulverized for 5 min using a Taninaka type pulverizer. Then, ethyleneglycol was added in an amount of 0.23% by weight based on the weight of hydrotalcite to the thus obtained particles, and the resultant mixture was pulverized for 2.5 min using a Taninaka type pulverizer. As a result, it was confirmed that the thus obtained surface-treated hydrotalcite-based compound particles had a specific surface area of 94.8 m$^2$/g, an average plate surface diameter of 0.08 μm and a crystallite size of 204 Å; conceptual values x and y as calculated from a water vapor adsorption thereof were 0.1094 and 0.2445, respectively; and agglomerated particles thereof had a maximum particle diameter of 22.3 μm and D$_{50}$ of 4.38 μm.

5 g of the thus obtained hydrotalcite-based compound particles were added to 100 g of a solution prepared by dissolving KCl in a mixed solvent of 50% by volume of ethanol and pure water which was maintained at 50° C. (Cl$^-$ content: 0.4 mol/L). The thus obtained mixture was aged for 20 hours and 70 hours while maintaining a temperature thereof at 50° C. to evaluate a capability of capturing Cl$^-$ and measure amounts of Mg and Al dissolved in the solution, respectively.

Meanwhile, the amounts of Mg and Al dissolved were analyzed as follows. That is, 40 mL of a KCl/ethanol/pure water solution from which the hydrotalcite-based compound particles were separated by filtration, was mixed with 1 mL of hydrochloric acid and heated to 90° C. The resultant solution was maintained at 90° C. for 30 min and then subjected to ICP analysis. Also, the amount of Cl$^-$ captured was measured by subjecting the KCl/ethanol/pure water solution from which the hydrotalcite-based compound particles were separated by filtration, to ICP analysis.

Reference Example 1

The same procedure as defined in Example 6 was conducted except that the hydrotalcite-based compound particles were pulverized for 1 min using a Taninaka type pulverizer without adding no surface-treating agent thereto. As a result, it was confirmed that the thus obtained hydrotalcite-based compound particles had a specific surface area of 104.7 m$^2$/g, an average plate surface diameter of 0.07 μm and a crystallite size of 198 Å; conceptual values x and y as calculated from a water vapor adsorption thereof were 0.033 and 0.2165, respectively; and agglomerated particles thereof had a maximum particle diameter of 22.9 μm and D$_{50}$ of 5.07 μm.

The thus obtained hydrotalcite-based compound particles were analyzed by the same method as defined in Example 6 to evaluate a capability of capturing Cl$^-$ and measure amounts of Mg and Al dissolved in the solution, respectively.

TABLE 2

| Examples and Reference Examples | Reaction time (hours) | Cl$^-$-capturing percentage (%) | Amount of Mg eluted (mg/L) | Amount of Al eluted (mg/L) |
|---|---|---|---|---|
| Example 6 | 20 | 42 | 1.2 | 0 |
| Reference Example 1 | 20 | 45 | 5.7 | 0.20 |
| Example 6 | 70 | 84 | 1.3 | 0 |
| Reference Example 1 | 70 | 88 | 6.8 | 0.22 |

What is claimed is:

1. Hydrotalcite-based compound particles which are surface-treated with an organic compound having not less than 3 carbon atoms, and have a specific surface area of 5 to 150 m$^2$/g, a conceptual value x of 0.06 to 0.59 and a conceptual value y of 0.225 to 0.260, wherein the conceptual value x corresponds to x represented by the following formula:

$$x=(P/(V\times(P_0-P)))/(P/P_0)$$

(wherein V is a water vapor adsorption; P is a pressure at a measuring position; and P$_0$ is an atmospheric pressure), and the conceptual value y corresponds to y represented by the following formula:

$$y=V_m/S_{SET}$$

(wherein V$_m$ is a water vapor adsorption at P/P$_0$=0.2; and S$_{SET}$ is a specific surface area of the sample), in which the values x and y are determined from a water vapor adsorption curve thereof in a range where P/P$_0$ is 0.045 to 0.355 when exposed to a temperature of 25° C. and a humidity of 50% for 250 hours.

2. Hydrotalcite-based compound particles according to claim 1, which further have an average plate surface diameter of 0.05 to 1.0 μm and a crystallite size of 100 to 700 Å when determined from the Scherrer's formula using results of X-ray diffraction measurement.

3. Hydrotalcite-based compound particles according to claim 1, wherein agglomerated particles of the hydrotalcite-based compound particles have a maximum particle diameter of not more than 25 μm and D$_{50}$ of 0.04 to 5.0 μm as measured by a particle size distribution measuring method according to JIS R 1622.

4. Hydrotalcite-based compound particles according to claim 1, wherein a content of the organic compound having not less than 3 carbon atoms in the particles is from more than 0 to 10% by weight.

5. A resin stabilizer comprising the hydrotalcite-based compound particles as defined in claim 1 and a metal soap compound.

6. A resin stabilizer according to claim 5, which further comprises an additive.

7. A resin stabilizer according to claim 6, wherein the additive comprises at least one substances selected from the group consisting of a resin, a lubricant, a plasticizer, calcium carbonate, titanium oxide, silicon oxide, aluminum oxide, iron oxide, zeolite, a polyhydric alcohol, a hindered amine compound, a polyol, zinc dehydroacetate, □-diketone and an antioxidant.

8. A resin stabilizer according to claim 6, wherein the amount of the hydrotalcite-based compound particles is 2.5 to 15,000 parts by weight based on 100 parts by weight of the metal soap compound.

9. A halogen-containing resin composition comprising 0.01 to 30 parts by weight of the hydrotalcite-based compound particles as defined in claim 1, and 100 parts by weight of a halogen-containing resin.

10. A halogen-containing resin composition according to claim 9, further comprising 0 to 70 parts by weight of a plasticizer and 0.05 to 50 parts by weight of metal soap compound based on 100 parts by weight of the halogen-containing resin.

11. A halogen-containing resin composition according to claim 9, further comprising 0 to 70 parts by weight of a plasticizer, 0.05 to 50 parts by weight of metal soap compound and 1 to 50 parts by weight of calcium carbonate and/or titanium dioxide based on 100 parts by weight of the halogen-containing resin.

12. A halogen scavenger comprising the hydrotalcite-based compound particles as defined in claim 1.

13. An anion scavenger for capturing anions from a solution, comprising particles or a molded product of the hydrotalcite-based compound particles as defined in claim 1.

14. Hydrotalcite-based particles according to claim 1, wherein the conceptual value x is 0.1094 to 0.5644 and the conceptual value y is 0.2328 to 0.2550.

* * * * *